United States Patent
Uchigata et al.

(10) Patent No.: US 9,725,596 B2
(45) Date of Patent: Aug. 8, 2017

(54) POLYARYLENE SULFIDE RESIN COMPOSITION AND MOLDED BODY

(71) Applicant: DIC Corporation, Tokyo (JP)

(72) Inventors: Masanori Uchigata, Ichihara (JP); Takayuki Okada, Ichihara (JP); Taku Shimaya, Ichihara (JP)

(73) Assignee: DIC Corporation, Tokyo (JP)

(*) Notice: Subject to any disclaimer, the term of this patent is extended or adjusted under 35 U.S.C. 154(b) by 0 days.

(21) Appl. No.: 14/387,368

(22) PCT Filed: Mar. 22, 2013

(86) PCT No.: PCT/JP2013/058308
§ 371 (c)(1),
(2) Date: Sep. 23, 2014

(87) PCT Pub. No.: WO2013/141363
PCT Pub. Date: Sep. 26, 2013

(65) Prior Publication Data
US 2015/0080498 A1    Mar. 19, 2015

(30) Foreign Application Priority Data

Mar. 23, 2012  (JP) .................. 2012-067271

(51) Int. Cl.
*C08L 81/04* (2006.01)
*C08K 7/14* (2006.01)
*C08K 3/40* (2006.01)

(52) U.S. Cl.
CPC ............ *C08L 81/04* (2013.01); *C08K 3/40* (2013.01); *C08K 7/14* (2013.01); *C08L 2205/02* (2013.01); *C08L 2205/025* (2013.01); *C08L 2205/03* (2013.01)

(58) Field of Classification Search
CPC ................................ C08L 63/00; C08L 81/04
USPC ........................................................ 523/433
See application file for complete search history.

(56) References Cited

U.S. PATENT DOCUMENTS

| | | | | |
|---|---|---|---|---|
| 2003/0212204 | A1* | 11/2003 | Kawashima ............ | C08L 81/02 525/65 |
| 2004/0266899 | A1* | 12/2004 | Muenz .................. | C08G 59/40 521/135 |
| 2007/0093583 | A1* | 4/2007 | Kakegawa ............. | C08L 67/02 524/413 |
| 2007/0123627 | A1 | 5/2007 | Baek et al. | |
| 2008/0166511 | A1* | 7/2008 | Honma .................. | C08G 59/50 428/36.4 |
| 2009/0274844 | A1* | 11/2009 | Scheibel ................ | C09D 5/024 427/386 |
| 2012/0285674 | A1* | 11/2012 | Hirano ................ | H01L 23/3737 165/185 |

FOREIGN PATENT DOCUMENTS

| | | |
|---|---|---|
| JP | 11-043604 A | 2/1999 |
| JP | 11-71520 A | 3/1999 |
| JP | 2005306926 A * | 11/2005 |
| JP | 2009-126884 A | 6/2009 |

OTHER PUBLICATIONS

English machine translation of JP 2005-306926. Printed Sep. 22, 2015. Original Japanese document published Nov. 4, 2005.*
Extended European Search Report mailed Nov. 6, 2015, issued for the European patent application No. 13764839.0.

* cited by examiner

*Primary Examiner* — Megan McCulley
(74) *Attorney, Agent, or Firm* — Locke Lord LLP; James E. Armstrong, IV; Nicholas J. DiCeglie, Jr.

(57) ABSTRACT

Provided is a polyarylene sulfide resin composition including a polyarylene sulfide resin, an epoxy resin, glass fiber, and glass flake. The amount of the epoxy resin is 0.5 to 20 parts by mass, the amount of the glass fiber is 10 to 350 parts by mass, and the amount of the glass flake is 1 to 250 parts by mass relative to 100 parts by mass of the polyarylene sulfide resin. The epoxy resin is a combination of a bisphenol-type epoxy resin and a novolac-type epoxy resin. Also provided is a molded body formed by melt-molding the resin composition. The resin composition has good adhesiveness to epoxy resins and good flowability. Furthermore, a molded body having high thermal shock resistance can be produced using the resin composition.

16 Claims, No Drawings

POLYARYLENE SULFIDE RESIN COMPOSITION AND MOLDED BODY

TECHNICAL FIELD

The present invention relates to a polyarylene sulfide resin (hereinafter, may be abbreviated as "PAS resin") and more specifically relates to a polyarylene sulfide resin composition having good mechanical properties, high heat resistance, good formability, and high adhesiveness to epoxy resins.

BACKGROUND ART

PAS resins have high mechanical strength, high heat resistance, high chemical resistance, good formability, and good dimensional stability and, due to these characteristics, have been used as a material for components of electrical and electronic equipment, automobiles, or the like.

In many cases, such components are bonded to other components composed of an epoxy resin or the like in secondary processing. However, PAS resins have poor adhesiveness to other resins and, in particular, relatively poor adhesiveness to epoxy resins, which has posed a problem of poor adhesiveness between PAS resins and epoxy resins (hereinafter, this may be referred to simply as "adhesiveness") that occurs, for example, when PAS resins are bonded to each other with an epoxy-based adhesive, when a PAS resin is bonded to another material with an epoxy-based adhesive, or when an electrical and electronic component is sealed with an epoxy resin.

On the other hand, since they have poor toughness, PAS resins are easily broken under a thermal cycle, that is, a cycle of cooling and heating, or a thermal shock. That is, PAS resins have low thermal shock resistance. In addition, reinforcement using a fibrous reinforcing material such as glass fiber results in occurrence of anisotropy, which causes warpage, torsion, or the like of the molded body. Thus, PAS resins do not have sufficiently good dimensional stability.

In light of such facts, several studies have been conducted for the purpose of improving the thermal shock resistance and dimensional stability of PAS resins and the adhesiveness of PAS resins to epoxy resins. For example, a PAS resin composition including glass fiber, an olefin polymer, an epoxy resin, and glass flake has been proposed (see PTL 1). However, the thermal shock resistance of the PAS resin produced by this method, in which a bisphenol A-type epoxy resin is used as an epoxy resin, is insufficient for practical use while the PAS resin has good adhesiveness to epoxy resins and good flowability.

CITATION LIST

Patent Literature

PTL 1: Japanese Unexamined Patent Application Publication No. 2005-306926

SUMMARY OF INVENTION

Technical Problem

Accordingly, an object of the present invention is to provide a PAS composition having good adhesiveness to epoxy resins, good flowability, and improved thermal shock resistance and a molded body formed of the PAS composition.

Solution to Problem

The inventors of the present invention have conducted various studies and, as a result, found that both the adhesiveness of a PAS resin to epoxy resins and the thermal shock resistance of a PAS resin can be improved by mixing the PAS resin with an epoxy resin, glass fiber, and glass flake, the epoxy resin being a combination of a bisphenol-type epoxy resin and a novolac-type epoxy resin. Thus, the present invention has been made.

Specifically, the present invention provides a polyarylene sulfide resin composition including a polyarylene sulfide resin (A), an epoxy resin (B), glass fiber (C1), and glass flake (C2). The amount of the epoxy resin (B) is 0.5 to 20 parts by mass, the amount of the glass fiber is 10 to 350 parts by mass, and the amount of the glass flake is 1 to 250 parts by mass relative to 100 parts by mass of the polyarylene sulfide resin (A). The epoxy resin (B) is a combination of a bisphenol-type epoxy resin (B1) and a novolac-type epoxy resin (B2).

The present invention also provides a molded body formed by melt-molding the PAS resin composition.

Advantageous Effects of Invention

According to the present invention, a PAS composition having good adhesiveness to epoxy resins, good flowability, and improved thermal shock resistance and a molded body formed of the PAS composition can be provided.

DESCRIPTION OF EMBODIMENTS

The PAS resin composition according to the present invention includes a polyarylene sulfide resin (A), an epoxy resin (B), glass fiber (C1), and glass flake (C2). The amount of the epoxy resin (B) is 0.5 to 20 parts by mass, the amount of the glass fiber is 10 to 350 parts by mass, and the amount of the glass flake is 1 to 250 parts by mass relative to 100 parts by mass of the polyarylene sulfide resin (A). The epoxy resin (B) is a combination of a bisphenol-type epoxy resin (B1) and a novolac-type epoxy resin (B2).

The polyarylene sulfide resin (A) used in the present invention has a resin structure including, as a repeating unit, a structure in which a sulfur atom is bonded to an aromatic ring. Specifically, the polyarylene sulfide resin (A) used in the present invention includes, as a repeating unit, the structural site represented by Formula (1).

[Chem. 1]

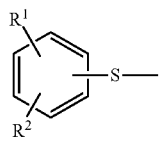

Formula (1)

(In Formula (1), $R^1$ and $R^2$ each independently represent a hydrogen atom, an alkyl group having a carbon number of 1 to 4, a nitro group, an amino group, a phenyl group, a methoxy group, or an ethoxy group)

In the structural site represented by Formula (1), in particular, $R^1$ and $R^2$ of Formula (1) are preferably hydrogen atoms from the viewpoint of the mechanical strength of the polyarylene sulfide resin (A). When $R^1$ and $R^2$ are hydrogen atoms, examples of the structural site include the structure represented by Formula (2) in which a sulfur atom is bonded to an aromatic ring at the para position and the structure represented by Formula (3) in which a sulfur atom is bonded to an aromatic ring at the meta position.

[Chem. 2]

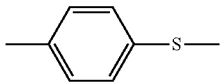

Formula (2)

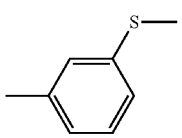

Formula (3)

Among these structures, in particular, the structure represented by Formula (2), in which a sulfur atom is bonded to an aromatic ring at the para position in the repeating unit, is preferably employed from the viewpoints of the heat resistance and crystallinity of the polyarylene sulfide resin (A).

The polyarylene sulfide resin (A) may also include, in addition to the structural site represented by Formula (1), the following structural sites represented by Formulae (4) to (7) so that the content of the structural sites represented by Formulae (4) to (7) is 30 mol % or less of the total amount of the structural sites represented by Formulae (4) to (7) and the structural site represented by Formula (1).

[Chem. 3]

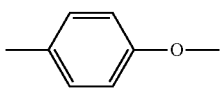

Formula (4)

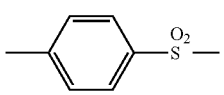

Formula (5)

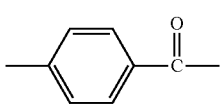

Formula (6)

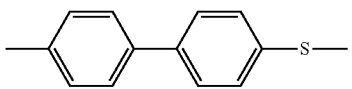

Formula (7)

In particular, in the present invention, the content of the structural sites represented by Formulae (4) to (7) is preferably 10 mol % or less from the viewpoints of the heat resistance and mechanical strength of the polyarylene sulfide resin (A). In the case where the polyarylene sulfide resin (A) includes the structural sites represented by Formulae (4) to (7) above, those structural sites may be bonded to one another in the form of a random copolymer or a block copolymer.

The polyarylene sulfide resin (A) may include the trifunctional structural site represented by Formula (8) below, a naphthyl-sulfide bond, or the like in its molecular structure.

[Chem. 4]

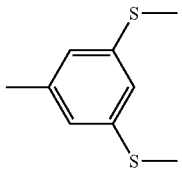

Formula (8)

The content of the trifunctional structural site, a naphthyl-sulfide bond, or the like is preferably 3 mol % or less and is more preferably 1 mol % or less of the total number of moles of other structural sites and the trifunctional structural site, a naphthyl-sulfide bond, or the like.

The peak molecular weight of the PAS resin used in the present invention, which is determined from the molecular weight distribution of the PAS resin obtained by gel permeation chromatography using 1-chloronaphthalene as a solvent, has a lower limit of 20,000 or more. The peak molecular weight of the PAS resin is preferably 25,000 or more. On the other hand, the upper limit of the peak molecular weight of the PAS resin is 100,000 or less. The peak molecular weight of the PAS resin is preferably 80,000 or less and is more preferably 50,000 or less. When the peak molecular weight of the PAS resin falls within the above-described ranges, the resin molded body formed of the PAS resin composition according to the present invention advantageously has sufficiently high mechanical strength. Furthermore, during a molding process, the PAS resin advantageously has good flowability and high mechanical strength, such as bending strength, in the most balanced manner.

In the present invention, the peak molecular weight is determined on the basis of a polystyrene standard by gel permeation chromatography using polystyrene as a reference material. The peak molecular weight does not vary depending on how the baseline of the molecular weight distribution curve is determined in gel permeation chromatography while the number-average molecular weight and the weight-average molecular weight vary depending on how the baseline of the molecular weight distribution curve is determined.

The melt viscosity (V6) of the PAS resin (A) at 300° C. is 5 to 1,000 [Pa·s]. The expression "melt viscosity (V6) at 300° C." used herein refers to the melt viscosity of the PAS resin (A) that has been held for 6 minutes, which was measured at 300° C. using a flow tester at a load of 1.96 MPa with an orifice in which the ratio of the orifice length to the orifice diameter (orifice length/orifice diameter) is 10/1. The non-Newton index of the PAS resin (A) is 0.90 to 1.25. In the case where a linear-type polyarylene sulfide resin is used as the PAS resin (A), the non-Newton index of the PAS resin (A) is preferably 0.90 to 1.20, is more preferably 0.95 to 1.15, and is further preferably 0.95 to 1.10. A polyarylene sulfide resin having the above-described non-Newton index has good mechanical properties, good flowability, and high wear resistance. Note that the term "non-Newton index (N-value)" used herein refers to a value calculated using the following expression from the shear rate and the shear stress of the PAS resin (A) which are measured using Capirograph at 300° C. under a condition where the ratio of the orifice length (L) to the orifice diameter (D) is L/D=40.

[Math. 1]

$SR = K \cdot SS^N$  (II)

[where, SR represents a shear rate (sec$^{-1}$), SS represents a shear stress (dyne/cm$^2$), and K is a constant] The closer to 1 the N-value, the closer the structure of PPS is to a linear shape. The larger the N-value, the larger the number of the branches in the structure of PPS. The PAS resin (A) according to the present invention includes carboxy groups and an alkali metal salt of a carboxy group at the terminals of the PAS resin (A). The content of the carboxy groups and the alkali metal salt of a carboxy group in the PAS resin (A) is 25 to 60 [μmmol/g] and is preferably 30 to 55 [μmol/g]. There are the following tendencies for the carboxy groups and the alkali metal salt of a carboxy group in the PAS resin (A): the higher the hot-water temperature used in a hot-water washing process, the larger the number of terminal carboxy groups in the resin; and, conversely, the lower the hot-water temperature, the smaller the number of terminal carboxy groups in the resin. There is no particular need to limit the content of the terminal carboxy groups in the PAS resin (A) to a specific value. However, the content of the terminal carboxy groups in the PAS resin (A) is preferably 25 [μmol/g] or less, is more preferably 0 to 20 [μmol/g], and is further preferably 5 to 15 [μmol/g]. The expression "0 [μmol/g]" normally means that the content of the terminal carboxy groups is below the detection limit while it desirably means the PAS resin (A) does not include the terminal carboxy groups.

Examples of a method for producing the PAS resin (A) include, but are not particularly limited to, the following: 1) a method in which a dihalogeno aromatic compound and, as needed, another copolymerizing constituent are caused to polymerize in the presence of sulfur and sodium carbonate; 2) a method in which a dihalogeno aromatic compound and, as needed, another copolymerizing constituent are caused to polymerize in a polar solvent in the presence of a sulfidation agent; 3) a method in which self-condensation of p-chlorothiophenol and, as needed, another copolymerizing constituent is performed; and 4) a method in which a sulfidation agent, a dihalogeno aromatic compound, and as needed, another copolymerizing constituent are caused to react in a polar organic solvent. Among these methods, the method described in 4) is versatile and preferably employed. In order to control the degree of polymerization, an alkali metal salt of carboxylic acid or sulfonic acid may be used in the polymerization reaction. Alternatively, an alkali hydroxide may also be used in the polymerization reaction. In particular, among methods that belong to 4) described above, the following methods are preferably employed: a method in which a dihalogeno aromatic compound is caused to react with a sulfidation agent in a polar organic solvent by introducing a hydrous sulfidation agent to a heated mixture including a polar organic solvent and a dihalogeno aromatic compound at a speed that allows moisture to be removed from the reaction mixture and thereby the moisture content in the reaction system is controlled to 0.02 to 0.5 moles per mole of the polar organic solvent in order to produce a PAS resin (see, Japanese Unexamined Patent Application Publication No. 07-228699); and a method in which a polyhalo aromatic compound, an alkali metal hydrosulfide, and an organic acid alkali metal salt are caused to react in the presence of a solid alkali metal sulfide and an aprotic polar organic solvent so that the amount of organic acid alkali metal salt is 0.01 to 0.9 moles per mole of a sulfur source while the moisture content in the reaction system is controlled to 0.02 moles per mole of the aprotic polar organic solvent (see, WO2010/058713 pamphlet).

The epoxy resin (B) used in the present invention is a combination of a bisphenol-type epoxy resin (B1) and a novolac-type epoxy resin (B2).

The epoxy equivalent of the epoxy resin (B1) used in the present invention is 400 to 5000 [g/eq.] and is preferably 450 to 4000 [g/eq.]. The epoxy equivalent of the epoxy resin (B1) is preferably 400 [g/eq.] or more in order to reduce the amount of gas generated and to improve flowability and adhesiveness to epoxy resins and metals. The epoxy equivalent of the epoxy resin (B1) is preferably 5000 [g/eq.] or less in order to improve thermal shock resistance. In particular, a bisphenol-type epoxy resin having an epoxy equivalent of about 170 to about 200 [g/eq.] disadvantageously increases the amount of gas generated.

The content of secondary hydroxyl groups in the epoxy resin (B1) used in the present invention is, but not particularly limited to, 2.0 to 5.0 [eq./kg] and is preferably 2.1 to 3.5 [eq./kg]. The content of secondary hydroxyl groups in the epoxy resin (B1) is preferably 2.0 [eq./kg] or more in order to reduce the amount of gas generated and to improve flowability and adhesiveness to epoxy resins and metals. The content of secondary hydroxyl groups in the epoxy resin (B1) is preferably 5.0 [eq./kg] or less in order to improve thermal shock resistance.

The softening point of the epoxy resin (B1) used in the present invention is, but not particularly limited to, 60° C. to 150° C. and is preferably 65° C. to 130° C. The softening point of the epoxy resin (B1) is preferably 60° C. or more in order to reduce the amount of gas generated and to improve flowability and adhesiveness to epoxy resins and metals. The softening point of the epoxy resin (B1) is preferably 150° C. or less in order to improve thermal shock resistance.

Examples of the epoxy resin (B1) include bisphenol-type glycidyl ethers, and specific examples thereof include a bisphenol A-type epoxy resin, a bisphenol F-type epoxy resin, a biphenyl-type epoxy resin, a tetramethylbiphenyl-type epoxy resin, a bisphenol S-type epoxy resin, a bisphenol AD-type epoxy resin, a tetrabromobisphenol A-type epoxy resin, and a dihydroxynaphthalene-type epoxy resin. Among these resins, a bisphenol A-type epoxy resin is preferably used.

The epoxy equivalent of the epoxy resin (B2) used in the present invention is 170 to 300 [g/eq.] and is preferably 190 to 250 [g/eq.]. The epoxy equivalent of the epoxy resin (B2) is preferably 170 [g/eq.] or more in order to improve thermal shock resistance. The epoxy equivalent of the epoxy resin (B2) is preferably 300 [g/eq.] or less in order to improve flowability and adhesiveness to epoxy resins and metals.

The softening point of the epoxy resin (B2) used in the present invention is, but not particularly limited to, 55° C. to 90° C. and is preferably 60° C. to 80° C. The softening point of the epoxy resin (B2) is preferably 55° C. or more in order to improve thermal shock resistance. The softening point of the epoxy resin (B2) is preferably 90° C. or less in order to improve flowability and adhesiveness to epoxy resins and metals.

Examples of the epoxy resin (B2) include novolac-type epoxy resins that are produced by reacting, with epihalohydrin, a novolac-type phenol resin produced by a condensation reaction of a phenol and an aldehyde. Specific examples of the novolac-type epoxy resins include a phenol novolac-type epoxy resin, a cresol novolac-type epoxy resin, a naphthol novolac-type epoxy resin, a naphthol-phenol co-condensation novolac-type epoxy resin, a naphthol-cresol co-condensation novolac-type epoxy resin, and a brominated phenol novolac-type epoxy resin. Among these epoxy resins, a phenol novolac-type epoxy resin and a cresol novolac-type epoxy resin are preferably used.

The mixing ratio of the epoxy resin (B1) to the epoxy resin (B2) used in the present invention is controlled appropriately so that the epoxy equivalent of the entire epoxy resin (B) is 250 to 3500 [g/eq.]. The mixing ratio of the epoxy resin (B1) to the epoxy resin (B2) is preferably (B1)/(B2)= 10/1 to 1/10, is more preferably 4/1 to 1/4, and further preferably 3.5/1 to 1/3.5 in order to improve thermal shock resistance, flowability, and adhesiveness to epoxy resins and metals.

The epoxy resins used as the epoxy resin (B) in the present invention may be melt-kneaded after being mixed with each other or may be separately charged into and melt-kneaded in an extruder. The amount of the bisphenol-type epoxy resin (B1) and the novolac-type epoxy resin (B2) in terms of an epoxy resin composition is 0.5 to 20 parts by mass and is preferably 1 to 15 parts by mass relative to 100 parts by mass of the polyarylene sulfide resin (A). The amount of the bisphenol-type epoxy resin (B1) and the novolac-type epoxy resin (B2) is controlled appropriately depending on the purpose and application so that the advantages of the present invention are not impaired.

The epoxy equivalent of the bisphenol-type epoxy resin (B1) and the novolac-type epoxy resin (B2) used in the present invention in terms of an epoxy resin composition is 220 to 1600 [g/eq.] and is preferably 250 to 1000 [g/eq.]. The epoxy equivalent of the bisphenol-type epoxy resin (B1) and the novolac-type epoxy resin (B2) is preferably 220 [g/eq.] or more in order to improve flowability and adhesiveness to epoxy resins and metals. The epoxy equivalent of the bisphenol-type epoxy resin (B1) and the novolac-type epoxy resin (B2) is preferably 3500 [g/eq.] or less in order to improve thermal shock resistance. The content of the secondary hydroxyl groups in the epoxy resin (B) is preferably 0.18 to 4.5 [eq./kg] and is more preferably 0.50 to 3.0 [g/eq.]. The content of the secondary hydroxyl groups in the epoxy resin (B) is preferably 0.18 [eq./kg] or more in order to improve flowability and adhesiveness to epoxy resins and metals. The content of the secondary hydroxyl groups in the epoxy resin (B) is preferably 4.5 [eq./kg] or less in order to improve thermal shock resistance.

The content of epoxy groups in a novolac-type epoxy resin per unit amount is high, and a novolac-type epoxy resin has a high reactivity with the terminals of a polyarylene sulfide resin. This improves the thermal shock resistance of an arylene sulfide resin produced by polymerization using the novolac-type epoxy resin. The content of hydroxyl groups per unit amount in a bisphenol-type epoxy resin having a secondary hydroxyl group is high, which improves adhesiveness to epoxy resins and metals. Furthermore, a novolac-type epoxy resin and a bisphenol-type epoxy resin having a secondary hydroxyl group have good compatibility with each other. Thus, in the present invention, by using a novolac-type epoxy resin having the above-described functions and a bisphenol-type epoxy resin having a secondary hydroxyl group in a combined manner at a specific ratio, both thermal shock resistance and adhesiveness to cured products of epoxy resins and metals, which have originally been considered to be mutually incompatible properties, can be synergistically improved.

The resin composition according to the present invention further includes, in addition to the above-described constituents, a filler (C), that is, glass fiber (C1) and glass flake (C2), in order to further improve properties such as mechanical strength, in particular, thermal shock strength, heat resistance, dimensional stability, and the like. The amount of glass fiber added to the resin composition is 10 to 350 parts by mass, is preferably 20 to 100 parts by mass, and is more preferably 30 to 80 parts by mass relative to 100 parts by mass of the polyarylene sulfide resin. The amount of glass fiber added to the resin composition is preferably 10 parts by mass or more in order to improve heat resistance, mechanical strength, and in particular, thermal shock resistance. The amount of glass fiber added to the resin composition is preferably 350 parts by mass or less in order to improve dimensional stability and flowability. The amount of glass flake added to the resin composition is 1 to 200 parts by mass, is preferably 5 to 100 parts by mass, and is more preferably 10 to 50 parts by mass relative to 100 parts by mass of the polyarylene sulfide resin. The amount of glass flake added to the resin composition is preferably 1 part by mass or more in order to improve heat resistance, mechanical strength, and in particular, thermal shock resistance, and dimensional stability. The amount of glass flake added to the resin composition is preferably 350 parts by mass or less in order to improve flowability. The glass fiber may be chopped strands, which are used as compounds for injection molding. The diameter of the chopped strands is preferably 3 to 20 μm and is more preferably 6 to 13 μm. The length of the chopped strands is preferably 3 to 6 mm.

The glass flake used in the present invention is composed of scale-like glass having an average particle size of 10 to 4000 μm and/or an average thickness of 0.1 to 20 μm. Glass flake that has been treated using a silane coupling agent or the like may also be used as the glass flake. In the present invention, the scale-like glass flake dispersed in the molded product reduces the linear expansion coefficients of the resin composition both in the flowing direction thereof and a direction perpendicular to the flowing direction, which improves the resistance to thermal shock caused due to the repetition of cooling and heating. In particular, in the present invention, the average particle size of the scale-like glass flake is preferably 100 to 300 μm and/or the average thickness of the scale-like glass flake is preferably 2 to 10 μm in order to enhance resistance to moisture permeation and surface appearance. Scale-like glass flake having an average particle size of less than 100 μm and/or an average thickness of less than 2 μm may rise to the surface of the molded product together with glass fiber, which impairs surface appearance. If scale-like glass flake having an average particle size exceeding 300 μm and/or an average thickness exceeding 10 μm is used, some scale-like glass flakes may be crushed during melt-kneading. This results in formation of scale-like glass flake having a small particle size, which may rise to the surface of the molded product together with glass fiber and thereby impairs surface appearance. Note that the terms "average particle size" and "average thickness" refer to the particle size at 50% in a cumulative particle size distribution curve determined by laser diffractometry.

In addition to the glass fiber (C1) and the glass flake (C2), any publicly known material may be used as a filler as long as it does not impair the advantages of the present invention. Fillers having various shapes, such as fibrous materials and non-fibrous materials, that is, for example, grainy materials or tabular materials, may be used.

Specific examples of the fibrous filler (C1) include a carbon fiber, a silane-glass fiber, a ceramic fiber, an aramid fiber, metal fibers, a potassium titanate fiber, a silicon carbide fiber, a calcium sulfate fiber, a calcium silicate fiber, and natural fibers such as wollastonite. Specific examples of the non-fibrous filler (C2) include barium sulfate, calcium sulfate, clay, pyrophyllite, bentonite, sericite, zeolite, mica, mica, talc, attapulgite, ferrite, calcium silicate, calcium carbonate, magnesium carbonate, and glass beads.

The filler used in the present invention is not an essential constituent. However, using more than 0 part by mass, normally 10 parts by mass or more, and 50 parts by mass or less of filler relative to 100 parts by mass of the polyarylene sulfide resin improves various properties such as strength, stiffness, heat resistance, heat dissipation capability, and dimensional stability depending on the purpose of the filler added.

In addition to the above-described constituents, depending on the application, the polyarylene sulfide resin composition according to the present invention may further include the following resins: a synthetic resin such as polyester, polyamide, polyimide, polyetherimide, polycarbonate, polyphenylene ether, polysulfone, polyethersulfone, polyether ether ketone, polyether ketone, polyarylene, polyethylene, polypropylene, polytetrafluoroethylene, polydifluoroethylene, polystyrene, an ABS resin, a silicone resin, a phenol resin, a urethane resin, or a liquid crystal polymer; an elastomer such as fluororubber or silicone rubber; and, in particular, a polyolefin elastomer having at least one functional group selected from the group consisting of an epoxy group, an amino group, a carboxy group, an isocyanato group, and the partial structures represented by the Structural Formulae (1) and (2):

[Chem. 5]

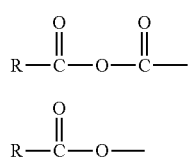

Structural Formula (1)

Structural Formula (2)

(in Structural Formulae (1) and (2), R represents an alkyl group having a carbon number of 1 to 8). The amount of the above-described resin added to the polyarylene sulfide resin composition, although it varies depending on the purpose and cannot be specified unconditionally, may be controlled so as to be 0.01 to 1000 parts by mass relative to 100 parts by mass of the polyarylene sulfide resin (A) appropriately depending on the purpose and the application so that the advantages of the present invention are not impaired.

In a molding process, various additives such as a coupling agent, a colorant, a heat-resistant stabilizer, a ultraviolet stabilizer, a foaming agent, an anticorrosive, a flame retardant, and a lubricant may be added to the polyarylene sulfide resin composition according to the present invention as long as they do not impair the advantages of the present invention.

The amounts of these additives added to the polyarylene sulfide resin composition, although they vary depending on the purpose and cannot be specified unconditionally, may be controlled so as to be 0.01 to 1000 parts by mass relative to 100 parts by mass of the polyarylene sulfide resin (A) appropriately depending on the purpose and the application so that the advantages of the present invention are not impaired. The way to use these additives also varies depending on the purpose and cannot be specified unconditionally. For example, a coupling agent may be included in the filler in a preliminary treatment. However, a coupling agent is preferably used alone as an additive.

Examples of the coupling agent include silane-based coupling agents and titanium-based coupling agents. Among these coupling agents, silane coupling agents are preferably used. In particular, a silane coupling agent having a functional group that reacts with a carboxy group (e.g., an epoxy group, an isocyanato group, an amino group, or a hydroxyl group) is preferably used. Examples of such a silane coupling agent include epoxy group-containing alkoxysilane compounds such as γ-glycidoxypropyltrimethoxysilane, γ-glycidoxypropyltriethoxysilane, and β-(3,4-epoxycyclohexyl)ethyltrimethoxysilane; isocyanato group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane; and hydroxyl group-containing alkoxysilane compounds such as γ-hydroxypropyltrimethoxysilane and γ-hydroxypropyltriethoxysilane. The amount of the coupling agent added to the polyarylene sulfide resin composition is 0.01 to 1.0 parts by mass and is preferably 0.1 to 0.4 parts by mass relative to 100 parts by mass of the polyarylene sulfide resin (A).

A method for producing the PAS resin composition according to the present invention is not particularly limited. For example, raw materials, that is, the polyarylene sulfide resin (A), the epoxy resin (B), and the filler (C), are charged into a ribbon blender, a Henschel mixer, a V-blender, or the like in the form of powder, pellets, chips, or the like, then dry-blended, and melt-kneaded using a Banbury mixer, a mixing roll, a single or twin screw extruder, a kneader, or the like. In particular, a method in which melt-kneading is performed using a single or twin screw extruder, which has sufficiently high kneading power, is commonly employed.

The PAS resin composition according to the present invention can be used for various types of molding process such as injection molding, compression molding, extrusion molding, pultrusion molding, blow molding, and transfer molding, which are employed for forming composites, sheets, pipes, or the like. In particular, the PAS resin composition according to the present invention may be suitably used for injection molding since it has good releasability.

The PAS resin composition according to the present invention has good adhesiveness to resins other than PAS resins, such as epoxy resins, as well as the original properties of PAS resins, such as mechanical strength, heat resistance, and dimensional stability. Therefore, the PAS resin composition according to the present invention may be widely used in the following applications: electrical and electronic components such as a sensor, an LED lamp, a connector, a socket, a resistor, a relay casing, a switch, a coil bobbin, a capacitor, a variable-capacitor casing, a radiator, various terminal boards, a transformer, a plug, a printed board, a tuner, a speaker, a microphone, a headphone, a compact motor, a magnetic head base, a semiconductor, a liquid crystal, an FDD carriage, an FDD chassis, a motor brush holder, a parabolic antenna, and computer-related components; home and office appliance components such as VTR components, TV components, an iron, a hair drier, rice cooker components, microwave oven components, acoustic components, components of sound equipment such as an audio, a laser disc, and a compact disc, lighting components, refrigerator components, air-conditioner components, typewriter components, and word-processor components; machine-related components such as office-computer-related components, telephone-related components, facsimile-related components, copier-related components, washing tools, motor components, a lighter, and a typewriter; optical device-related and precision machine-related components such as a microscope, a binocular, a camera, and a clock; kitchen-and-bathroom components such as a jumper valve, a combination faucet, pump parts, a piping joint, a flow control valve, a relief valve, a hot-water temperature sensor, a flow sensor, and a water meter housing; and automobile-and-vehicle-related components such as a valve alternator terminal, an alternator connector, an IC regulator, a potentiometer base for light dia, various valves such as an exhaust gas valve, various pipes of a fuel system, an exhaust system, and an intake system, an air-intake nozzle snorkel, an intake manifold, a fuel pump, an engine-cooling water joint, a carburetor main body, a carburetor spacer, an exhaust-gas sensor, a cooling-water sensor, an oil-temperature sensor, a throttle-position sensor, a crankshaft-position sensor, an airflow meter, a brake pad abrasion sensor, a thermostat base for air conditioners, a flow control valve for warm-air heater, a brush holder for radiator motors, a water-pump impeller, a turbine vane, wiper motor-related components, a distributor, a starter switch, a starter relay, a wire harness for transmission, a wind washer nozzle, an air conditioner panel switch board, a coil for fuel-related magnetic valves, a connector for fuse, a phone terminal, an electric-component-insulating board, a step motor rotor, a lamp socket, a lamp reflector, a lamp housing, a brake piston, a solenoid bobbin, an engine oil filter, an ignition device casing, a condenser casing for HEV, a vehicle-speed sensor, and a cable liner. The PAS resin composition according to the present invention may also be used as a material for manufacturing fiber or a film.

EXAMPLES

[Peak Molecular Weight of PAS Resin]

The peak molecular weight of a PPS resin was measured under the following conditions: apparatus: SSC-7000 (produced by Senshu Scientific Co., Ltd.), column: UT-805L (produced by Showa Denko K.K.), solvent: 1-chloronaphthalene, column temperature: 210° C., detector: UV detector (360 nm). The molecular weight distribution of a PPS resin was determined using six types of monodisperse polystyrenes for calibration. Then, a differential weight molecular-weight distribution was prepared, in which the vertical axis represents d(weight)/d Log(molecular weight) and the horizontal axis represents Log(molecular weight). The peak molecular weight was read from the horizontal axis.

[Melt Viscosity of PAS Resin]

The melt viscosity of a PAS resin that had been held for 6 minutes was measured at 300° C. using a flow tester (Koka Flowtester "model CFT-500D" produced by SHIMADZU CORPORATION) at a load of 1.96 MPa with an orifice in which the ratio of the orifice length to the orifice diameter was 10/1.

[Melt Viscosity of Epoxy Resin]

The melt viscosity of an epoxy resin at 150° C. was measured in accordance with ASTM D4287.

[Softening Point of Epoxy Resin]

The softening point of an epoxy resin was measured in accordance with JIS K7234.

Examples 1 to 7 and Comparative Examples 1 to 5

The materials having the specific compositions shown in Tables 1 to 3 were homogeneously mixed in a tumbler in the specific amounts shown in Tables 1 to 3. Subsequently, the mixed material was charged into a twin-screw extruder having a vent, "TEM-35B", produced by TOSHIBA MACHINE CO., LTD. and melt-kneaded at a resin-component discharge rate of 25 kg/hr, a screw speed of 250 rpm, the ratio (discharge rate/screw speed) of resin-component discharge rate (kg/hr) to screw speed (rpm) of 0.1 (kg/hr·rpm), and a resin temperature of 330° C. Thus, pellets of the resin composition were prepared.

The following evaluation tests were conducted using the pellets. Tables 1 to 3 show the test items and the evaluation results.

[Adhesive Strength of PAS Resin Composition to Epoxy Resin]

The pellets were supplied into an injection-molding machine (SG75-HIPRO•MIII) produced by Sumitomo-Netstal in which a cylinder temperature was set to 320° C. Injection molding was performed using a molding die for ASTM Type I dumbbell pieces heated at 130° C. to prepare an ASTM Type I dumbbell piece. The ASTM Type I dumbbell piece was divided into two equal parts at the center thereof. A spacer (thickness: 1.8 to 2.2 mm, opening portion: 5 mm×10 mm) was interposed between the two parts of the ASTM Type I dumbbell piece and fixed in place using a clip. The spacer was prepared so that the area of a contact portion at which the ASTM Type I dumbbell piece was brought into contact with an epoxy adhesive was 50 mm$^2$. Then, an epoxy resin (two-part epoxy resin produced by Nagase ChemteX Corporation, base resin: XNR5002, curing agent: XNH5002, mixing ratio of base resin:curing agent=100:90) was injected into the opening portion. Then, heating was performed for 3 hours in a hot-air drying machine kept at 135° C. to cause the epoxy resin to be cured, and thereby the two parts of the ASTM Type I dumbbell piece were bonded to each other. After cooling was performed at 23° C. for 1 day, the spacer was removed. Then, the tensile fracture strength of the resulting test piece was measured at 23° C. using a tensile testing machine produced by Instron Corporation at a strain rate of 1 mm/min and a distance between supporting points of 80 mm. The adhesive strength of the PAS resin composition to epoxy resins was calculated by dividing the tensile fracture strength by the area of the bonded surface.

[Spiral Flow]

The pellets of the polyphenylene sulfide resin composition were injection-molded into a test piece using the following injection-molding machine with a spiral molding die having a width of 6.0 mm and a thickness of 1.6 mm under the following conditions. The length (cm) of the test piece was considered to be the spiral-flow value.

Injection-molding machine screw diameter: 26.0 mm

Injection molding conditions cylinder temperature: 330° C.

Molding die temperature: 150° C.

[Thermal Shock Test]

A steel insert-block member having a length of 25 mm, a width of 40 mm, and a thickness of 10 mm was prepared. Two through holes having a diameter of 3.55 mm, which were parallel to the thickness direction of the member, were formed in the member. The centers of the diameters of the two through holes were positioned along a line connecting the midpoints of the length sides of the member to each other, which was parallel to the width side of the member. The midpoint of the centers of the diameters of the two through holes was aligned with the midpoint of the line connecting the midpoints of the length sides of the member to each other. The interval between the centers of the diameters of the two through holes was 20 mm. Subsequently, the insert-block member was disposed inside an injection-molding die using the two through holes and two cylindrical steel pins disposed inside the injection-molding die so that the insert-block member was held inside the injection-molding die. A polyphenylene sulfide resin composition was injection-molded into pellets, and the pellets of the polyphenylene sulfide resin composition was injection-molded into a molded product using an injection-molding die that was designed so that the entire outer periphery of the insert-block member was covered with a film of the polyphenylene sulfide resin composition having a thickness of 1 mm. The molded product made of the polyphenylene sulfide resin composition containing the insert-block member was subjected to a thermal shock test, in which cooling to and maintaining at −40° C. for 1 hour and then heating to and maintaining at 140° C. for 1 hour were defined as one thermal cycle. The number of cycles repeated until the fracture of the molded product occurred due to cracks formed in the molded product was counted.

TABLE 1

|  |  | Example 1 | Example 2 | Example 3 | Example 4 |
|---|---|---|---|---|---|
| Materials |  |  |  |  |  |
| PPS | a1 | 35 | 35 | 35 | 35 |
|  | a2 | 17.5 | 17.5 | 17.5 | 17.5 |
|  | a3 |  |  |  |  |
|  | a4 |  |  |  |  |
| Epoxy resin | b1 | 2 | 2 | 2 | 2 |
|  | b2 | 2 |  |  | 2 |
|  | b3 |  | 2 |  |  |
|  | b4 |  |  | 2 |  |
| Epoxy equivalent of epoxy resin [g/eq.] |  | 286 | 378 | 399 | 286 |
| Content of hydroxyl groups in epoxy resin [eq./kg] |  | 1.10 | 1.56 | 1.65 | 1.10 |
| Inorganic filler | c1 | 25 | 25 | 25 | 25 |
|  | c2 | 15 | 15 | 15 | 5 |
|  | c3 |  |  |  | 10 |
| Additive | d1 | 0.5 | 0.5 | 0.5 | 0.5 |
| Other resin | e1 | 1 | 1 | 1 | 1 |
| Evaluation items |  |  |  |  |  |
| SF (cm) |  | 50 | 53 | 55 | 50 |
| Adhesive strength to epoxy resin (MPa) |  | 9 | 8 | 7 | 9 |
| Thermal shock resistance |  | 40 | 40 | 40 | 32 |

TABLE 2

|  |  | Example 5 | Example 6 | Example 7 |
|---|---|---|---|---|
| Materials |  |  |  |  |
| PPS | a1 | 35 | 35 | 35 |
|  | a2 | 17.5 | 17.5 | 17.5 |
|  | a3 |  |  |  |
|  | a4 |  |  |  |
| Epoxy resin | b1 | 1 | 2 | 3 |
|  | b2 |  |  |  |
|  | b3 | 3 | 2 | 1 |
|  | b4 |  |  |  |
| Epoxy equivalent of epoxy resin [g/eq.] |  | 631 | 378 | 270 |
| Content of hydroxyl groups in epoxy resin [eq./kg] |  | 2.33 | 1.56 | 0.79 |
| Inorganic filler | c1 | 25 | 25 | 25 |
|  | c2 | 15 | 15 | 15 |
| Additive | d1 | 0.5 | 0.5 | 0.5 |
| Other resin | e1 | 1 | 1 | 1 |
| Evaluation items |  |  |  |  |
| SF(cm) |  | 55 | 53 | 50 |
| Adhesive strength to epoxy resin (MPa) |  | 10 | 8 | 7 |
| Thermal shock resistance |  | 30 | 32 | 35 |

TABLE 3

| Materials |  | Comparative Example 1 | Comparative Example 2 | Comparative Example 3 | Comparative Example 4 | Comparative Example 5 |
|---|---|---|---|---|---|---|
| PPS | a1 | 35 | 35 | 35 | 35 | 35 |
|  | a2 | 17.5 | 17.5 | 17.5 | 17.5 | 17.5 |
|  | a3 |  |  |  |  |  |
|  | a4 |  |  |  |  |  |
| Epoxy resin | b1 | 2 | 0.1 | 3.9 | 4 |  |
|  | b2 |  |  |  |  |  |
|  | b3 | 2 | 3.9 | 0.1 |  | 4 |
|  | b4 |  |  |  |  |  |
| Epoxy equivalent of epoxy resin [g/eq.] |  | 378 | 1582 | 215 | 210 | 1900 |
| Content of hydroxyl groups in epoxy resin [eq./kg] |  | 1.56 | 3.03 | 0.08 | 0.00 | 3.11 |
| Inorganic filler | c1 | 25 | 25 | 25 | 25 | 25 |
|  | c2 |  | 5 | 5 | 5 | 5 |
|  | c3 | 15 | 10 | 10 | 10 | 10 |
| Si | d1 | 0.5 | 0.5 | 0.5 | 0.5 | 0.5 |
| Other resin | e1 | 1 | 1 | 1 | 1 | 1 |
| Evaluation items |  |  |  |  |  |  |
| SF(cm) |  | 53 | 58 | 35 | 33 | 60 |
| Adhesive strength to epoxy resin (MPa) |  | 8 | 11 | 4 | 3.5 | 12 |

TABLE 3-continued

| Materials | Comparative Example 1 | Comparative Example 2 | Comparative Example 3 | Comparative Example 4 | Comparative Example 5 |
|---|---|---|---|---|---|
| Thermal shock resistance | 15 | 18 | 40 | 42 | 15 |

Surface Appearance Test

Examples 8 to 11 and Comparative Example 6

The materials having the specific compositions shown in Table 4 were homogeneously mixed in a tumbler in the specific amounts shown in Table 4. The mixed material was charged into a twin-screw extruder having a vent, "TEM-35B", produced by TOSHIBA MACHINE CO., LTD. and melt-kneaded at a resin-component discharge rate of 25 kg/hr, a screw speed of 250 rpm, the ratio (discharge rate/screw speed) of resin-component discharge rate (kg/hr) to screw speed (rpm) of 0.1 (kg/hr·rpm), and a resin temperature of 330° C. The melt-kneaded material was injection-molded into a rectangular plate having a size of 60 mm×60 mm×0.6 mm.

The surface of the molded product was observed. If rise of a filler was observed on 5% or more of the surface of the molded product, the molded product was considered to be failure. The surface appearance test was conducted for 100 plates. An evaluation of "A" was given when the defect rate was 0% to 5%. An evaluation of "B" was given when the defect rate was 5% to 10%. An evaluation of "C" was given when the defect rate was 10% or more.

TABLE 4

| Materials | | Example 8 | Example 9 | Example 10 | Example 11 | Comparative Example 6 |
|---|---|---|---|---|---|---|
| PPS | a1 | 35 | 35 | 35 | 35 | 35 |
| | a2 | 17.5 | 17.5 | 17.5 | 17.5 | 17.5 |
| | a3 | | | | | |
| | a4 | | | | | |
| Epoxy resin | b1 | 2 | 2 | 2 | 2 | 2 |
| | b2 | | | | | |
| | b3 | 2 | 2 | 2 | 2 | 2 |
| | b4 | | | | | |
| Epoxy equivalent of epoxy resin [g/eq.] | | 286 | 286 | 286 | 286 | 286 |
| Content of hydroxyl groups in epoxy resin [eq./kg] | | 1.10 | 1.10 | 1.10 | 1.10 | 1.10 |
| Inorganic filler | c1 | 25 | 25 | | 25 | 25 |
| | c2' | 15 | | | | |
| | c2 | | 15 | | | |
| | c2" | | | 15 | | |
| | c2''' | | | | 15 | |
| | c3 | | | | | 15 |
| Additive | d1 | 0.5 | 0.5 | 0.5 | 0.5 | 0.5 |
| Other resin | e1 | 1 | 1 | 1 | 1 | 1 |
| Evaluation items | | | | | | |
| SF (cm) | | 59 | 53 | 52 | 50 | 53 |
| Adhesive strength to epoxy resin (MPa) | | 8 | 8 | 8 | 8 | 8 |
| Thermal shock resistance | | 40 | 40 | 40 | 40 | 15 |
| Surface Appearance | | B | A | A | B | B |

The resins and materials shown in Tables 1 to 4 are described below.

PPS
  a1: Linear-type PPS "LR-300G" produced by DIC Corporation (peak molecular weight: 25000, melt viscosity (V6): 300 poise, non-Newton index: 1.08)
  a2: Crosslinked-type PPS "MB-651-55G" produced by DIC Corporation (peak molecular weight: 25000, melt viscosity (V6): 500 poise, non-Newton index: 1.20)

Epoxy Resin
  b1: Cresol novolac-type epoxy resin "EPICLON N-695P" produced by DIC Corporation (epoxy equivalent: 210 g/eq.)
  b2: Bisphenol A-type epoxy resin "EPICLON 1050" produced by DIC Corporation (epoxy equivalent: 450 g/eq., softening point: 64° C.)
  b3: Bisphenol A-type epoxy resin "EPICLON 7050" produced by DIC Corporation (epoxy equivalent: 1900 g/eq., softening point: 122° C.)
  b4: Bisphenol A-type epoxy resin "EPICLON HM-101" produced by DIC Corporation (epoxy equivalent: 3900 g/eq., softening point: 150° C.)

Inorganic Filler
  c1: Glass fiber "T-717H" produced by Nippon Electric Glass Co., Ltd. (diameter: 10 μm, chopped strand)
  c2: Glass flake "REFG-301" produced by Nippon Sheet Glass Co., Ltd. (scale-like glass flake, average particle size: 160 μm, average thickness: 5 μm)
  c2': Glass flake "MTD010FYX" produced by Nippon Sheet Glass Co., Ltd. (scale-like glass flake, average particle size: 10 μm, average thickness: 0.4 μm)
  c2": Glass flake "RCF-2300" produced by Nippon Sheet Glass Co., Ltd. (scale-like glass flake, average particle size: 300 μm, average thickness: 2 μm)
  c2''': Glass flake "REFG-112" produced by Nippon Sheet Glass Co., Ltd. (scale-like glass flake, average particle size: 600 μm, average thickness: 5 μm)
  c3: Calcium carbonate "Calcium Carbonate Class-1" produced by Sankyo Seifun K.K. (powder type)

Coupling Agent
  d1: 3-glycidoxypropyltrimethoxysilane "SH-6040" produced by Dow Corning Corporation Other Resin
  e1: Ethylene-maleic anhydride-ethyl acrylate copolymer "BONDINE AX8390" produced by Sumika Alchem Co., Ltd.

The invention claimed is:

1. A polyarylene sulfide resin composition comprising a polyarylene sulfide resin (A), an epoxy resin (B), glass fiber (C1), and glass flake (C2),
  wherein the amount of the epoxy resin (B) is 0.5 to 20 parts by mass, the amount of the glass fiber is 10 to 350 parts by mass, and the amount of the glass flake is 1 to 250 parts by mass relative to 100 parts by mass of the polyarylene sulfide resin (A),
  wherein the epoxy resin (B) is a combination of a bisphenol epoxy resin (B1) and a novolac epoxy resin (B2);

wherein the polyarylene sulfide resin composition further comprises one or more epoxy group-containing alkoxysilane compounds in the amount of 0.01 to 1.0 parts by mass relative to 100 parts by mass of the polyarylene sulfide resin (A);

wherein the polyarylene sulfide resin composition is obtained by melt-kneading thereof; and wherein the content of secondary hydroxyl groups in the bisphenol epoxy resin (B1) is 2.0 to 5.0 eq/kg.

2. The polyarylene sulfide resin composition according to claim 1, wherein the epoxy equivalent of the bisphenol epoxy resin (B1) is 400 to 5000 g/eq.

3. A molded body formed by melt-molding the polyarylene sulfide resin composition according to claim 2.

4. The polyarylene sulfide resin composition according to claim 1, wherein the epoxy equivalent of the novolac epoxy resin (B2) is 170 to 300 g/eq.

5. A molded body formed by melt-molding the polyarylene sulfide resin composition according to claim 4.

6. The polyarylene sulfide resin composition according to claim 1, wherein the mass ratio (B1)/(B2) of the bisphenol epoxy resin (B1) to the novolac epoxy resin (B2) is 10/1 to 1/10.

7. A molded body formed by melt-molding the polyarylene sulfide resin composition according to claim 6.

8. The polyarylene sulfide resin composition according to claim 1, wherein the epoxy equivalent of the epoxy resin (B) is 250 to 1000 g/eq.

9. A molded body formed by melt-molding the polyarylene sulfide resin composition according to claim 8.

10. The polyarylene sulfide resin composition according to claim 1, wherein the content of secondary hydroxyl groups in the epoxy resin (B) is 0.18 to 4.5 eq/kg.

11. A molded body formed by melt-molding the polyarylene sulfide resin composition according to claim 10.

12. The polyarylene sulfide resin composition according to claim 1, wherein the average particle size of the glass flake (C2) is 10 to 4000 μm.

13. A molded body formed by melt-molding the polyarylene sulfide resin composition according to claim 12.

14. The polyarylene sulfide resin composition according to claim 1, wherein the average thickness of the glass flake (C2) is 0.1 to 20 μm.

15. A molded body formed by melt-molding the polyarylene sulfide resin composition according to claim 14.

16. A molded body formed by melt-molding the polyarylene sulfide resin composition according to claim 1.

* * * * *